United States Patent [19]

Silla et al.

[11] Patent Number: 4,620,953
[45] Date of Patent: Nov. 4, 1986

[54] DEVICE FOR PREPARING FOAMY MILK

[76] Inventors: Martini Silla, Via Bassanese, 25, 31037 Loria (TV); Mario Chiaro, Via dei Salici, 16, 31033 Castelfranco Veneto (TV), both of Italy

[21] Appl. No.: 689,640

[22] Filed: Jan. 8, 1985

[30] Foreign Application Priority Data

Mar. 8, 1984 [IT] Italy ............... 47823 A/84

[51] Int. Cl.⁴ .................................................. B01F 3/04
[52] U.S. Cl. ..................................... 261/142; 99/453; 426/477; 261/DIG. 16
[58] Field of Search ............... 261/DIG. 16, 142; 99/323.1, 452, 453; 426/477

[56] References Cited

U.S. PATENT DOCUMENTS

| | | | |
|---|---|---|---|
| 1,461,653 | 7/1923 | Grindrod | 99/452 |
| 2,774,578 | 12/1956 | Spiess, Jr. et al. | 261/DIG. 16 |
| 2,919,726 | 1/1960 | Zimmermann et al. | 261/DIG. 16 |
| 3,017,165 | 1/1962 | Idzi | 261/DIG. 16 |
| 3,111,574 | 11/1963 | Spini | 99/453 |
| 3,231,009 | 1/1966 | Loliger | 99/452 |
| 4,144,293 | 3/1979 | Hamoto et al. | 261/DIG. 16 |
| 4,205,599 | 6/1980 | Franzosi | 99/323.1 |
| 4,457,876 | 7/1984 | Brand | 261/DIG. 16 |

FOREIGN PATENT DOCUMENTS

| | | | |
|---|---|---|---|
| 493957 | 6/1950 | Belgium | 99/453 |
| 499545 | 1/1954 | Canada | 99/453 |
| 1022454 | 1/1958 | Fed. Rep. of Germany | 99/453 |
| 292186 | 1/1932 | Italy | 426/477 |
| 305777 | 2/1933 | Italy | 426/477 |
| 314303 | 6/1956 | Switzerland | 99/453 |
| 729270 | 5/1955 | United Kingdom | 99/453 |

OTHER PUBLICATIONS

German Specification (Patentanmeldung) A17131 111/45g, 1-19-56, Olander, 99-453.

Primary Examiner—Tim Miles
Attorney, Agent, or Firm—Beveridge, DeGrandi and Weilacher

[57] ABSTRACT

A device for warming up, in a bar or at home, milk taken from a container 21 and pushed by a pump 23 into a heat exchanger 1, where the milk circuit, consisting in a coil 3 or the like, is immersed into the heating liquid for leading the same, under pressure, to outlet nozzles provided with counterboring shapes 105 and 105' for the spout for the mixing with the atmospheric air taken, by depression, from a small tube 19 so as to determine the outflow of warm foamy milk.

10 Claims, 19 Drawing Figures

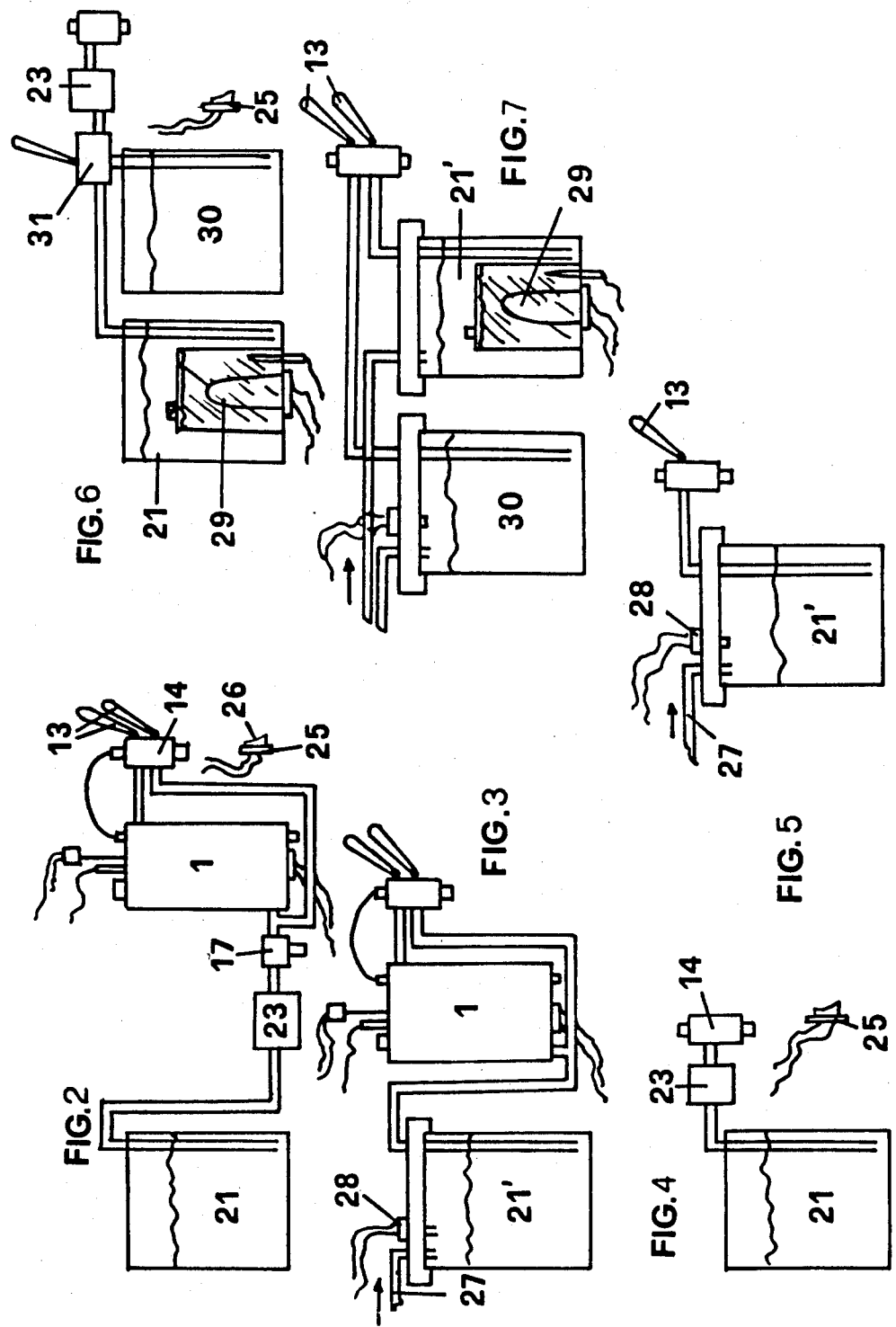

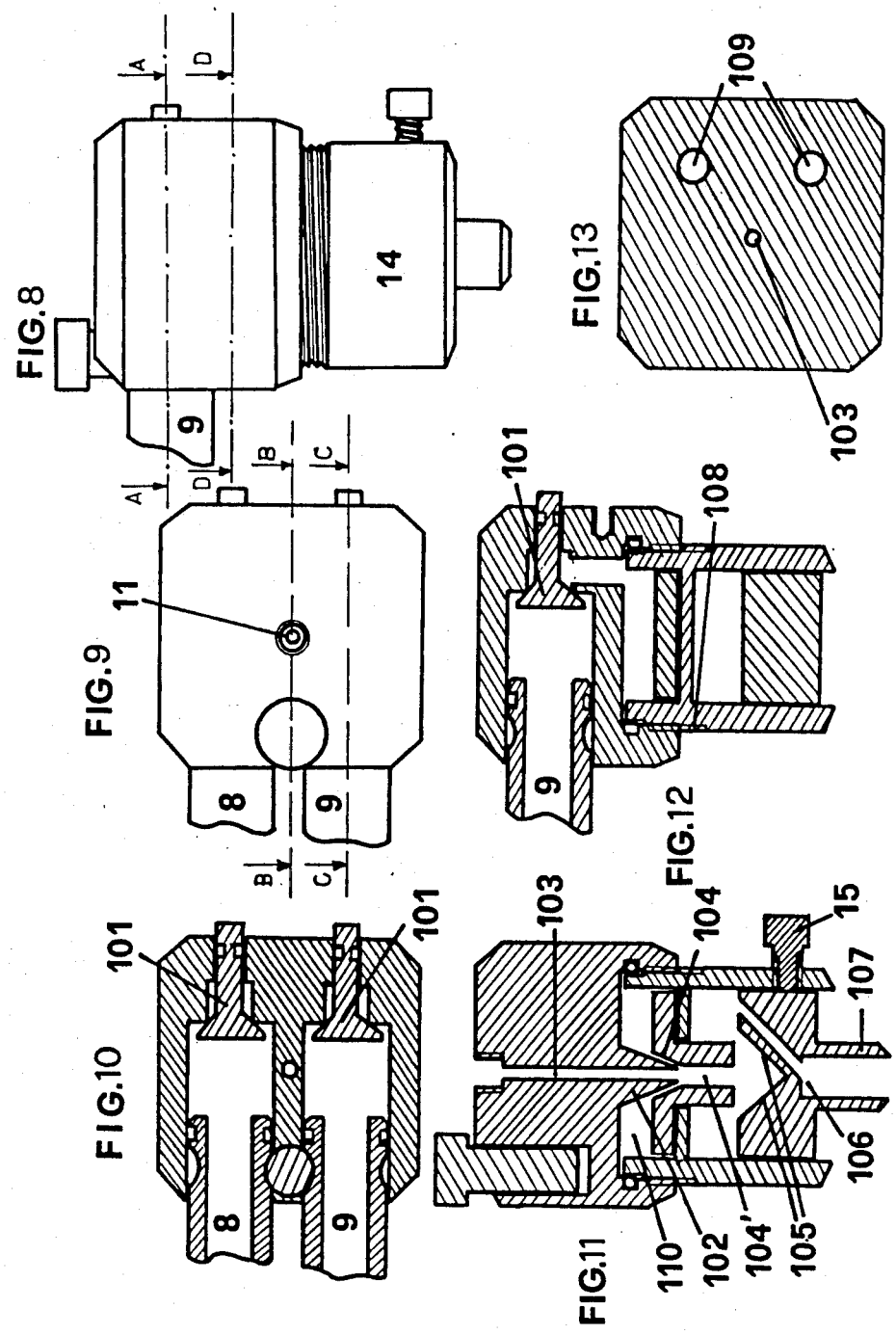

DEVICE FOR PREPARING FOAMY MILK

The present invention concerns a device for the quick preparation and the delivery of warmed up milk, without any water addition, and mixed with atmospheric air so as to make it foamy according to the requests.

It is well known that the warm milk used in bars and also in some families, pure or mixed with coffee, is obtained by a warming derived by a high pressure and temperature steam jet led by an immersion neck projecting from coffee machines.

The mixing of the milk with the steam causes a quick temperature increase and also the formation of a foam which the user particularly likes, due to the steam tensions of the fats present in the milk, when they get into contact with the atmospheric air.

Furthermore, the liquefaction of the steam in the milk causes a considerable watering of the same and consequently a modification of the taste and the consistence of the drink.

Furthermore, there are actually devices for whipping the liquid cream characterized in that pressurized air is added to the cream inside a forced run in which the whipping takes place gradually.

It is the purpose of the present invention to realize a new device, for bars and private users, for quickly obtaining foamy milk without addition of water in the form of steam.

This aim is reached by the device according to the present invention consisting—in a compact—in a container for the cold milk, in a delivery pump with an unidirectional non-return valve for the milk in a coil of a thermically insulated heat exchanger, full of oil or water or any other liquid heated up by an electric resistance, with a thermostat, and in one or more outlet nozzles for the pressurized milk onto counterboring shapes for the spout for determining a considerable turbulence thereof and consequent mixing with the atmospheric air taken by depression with consequent foam formation.

It is obvious that the device according to the present invention shows, beneath a high efficiency, the advantage of a hygiene complete in functioning, as the milk, in the whole hydraulic circuit, is completely separated from the heating liquid in which the coil is immersed.

It is a main feature of the present invention that the necessary energy is given to the milk for the formation of the foam bubbles in the form of a pressure obtained by means of a pump or, in a variant, by means of compressed air.

Furthermore, the milk inside said coil always remains under pressure also when it is not to be used so that any evaporation of the volatile components thereof is prevented.

For the same reason air is never present along the whole hydraulic circuit so as to avoid drying and incrustation.

The present invention will be described more in detail hereinbelow according to the attached drawings in which some preferred embodiments are shown.

FIG. 2 shows a scheme of the precedent embodiment provided with an atmospheric pressure reservoir and a pressure push pump.

FIG. 3 shows a variant of the device fed with compressed air with pressure reservoir.

FIG. 4 shows a variant with a simplified structure for home use, provided from the outside with warm or cold milk, and with a pump.

FIG. 5 shows a simplified variant according to FIG. 4 operated by compressed air.

FIGS. 6 and 7 show the schemes of variants with a separated milk reservoir provided with an internal heater respectively operated by the pump and by the compressed air.

FIGS. 8 and 9 show a lateral and top view of a variant of the device with an outlet nozzle for the foamy milk with counterboring concave cone shapes.

FIGS. 10, 11, 12 and 13 respectively show sections A—A, B—B, C—C and D—D of FIGS. 8 and 9.

Figure 1:
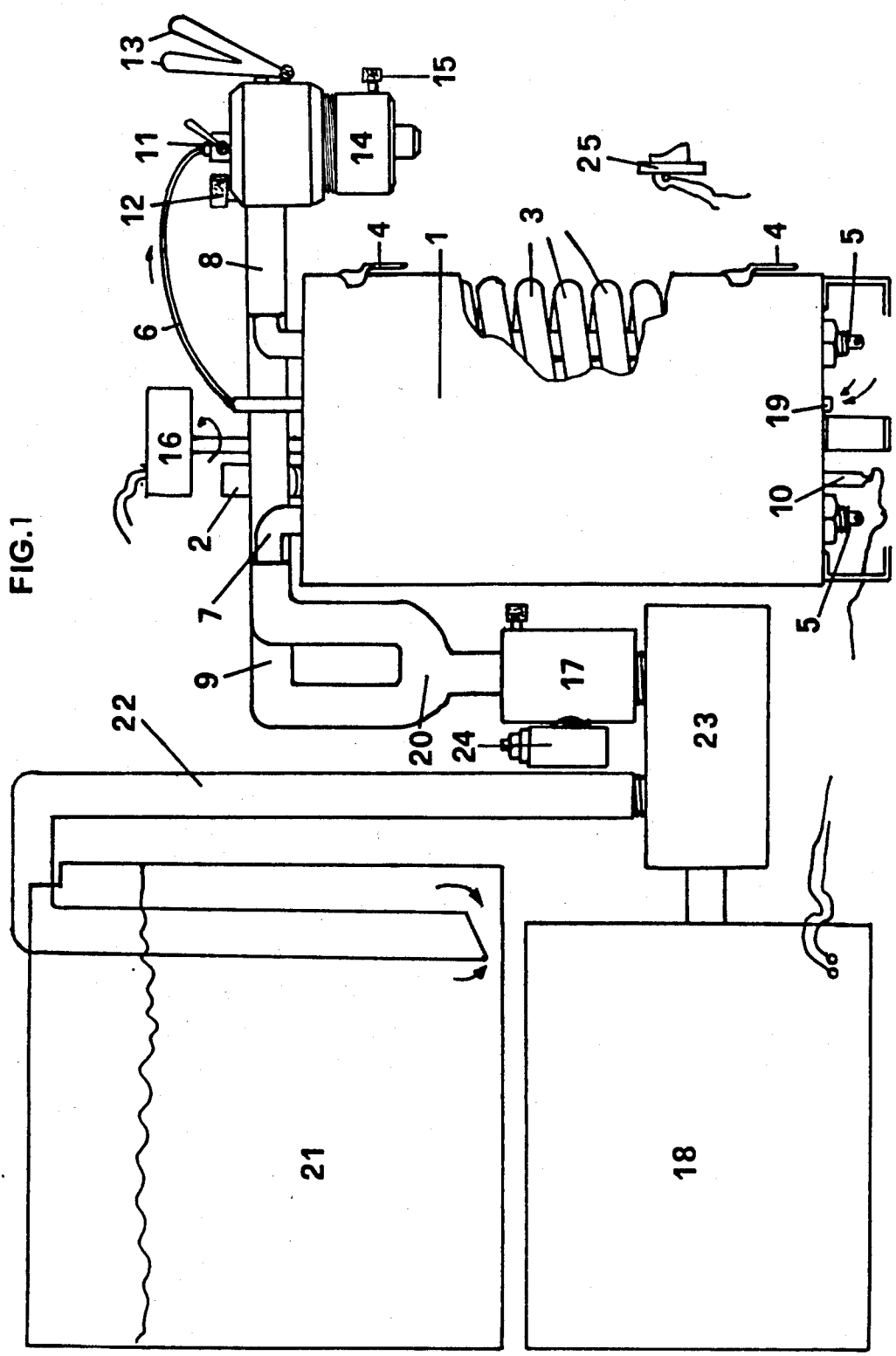
FIG. 1 shows in a lateral and partially split view a complete device according to the present invention.
Figure 14:
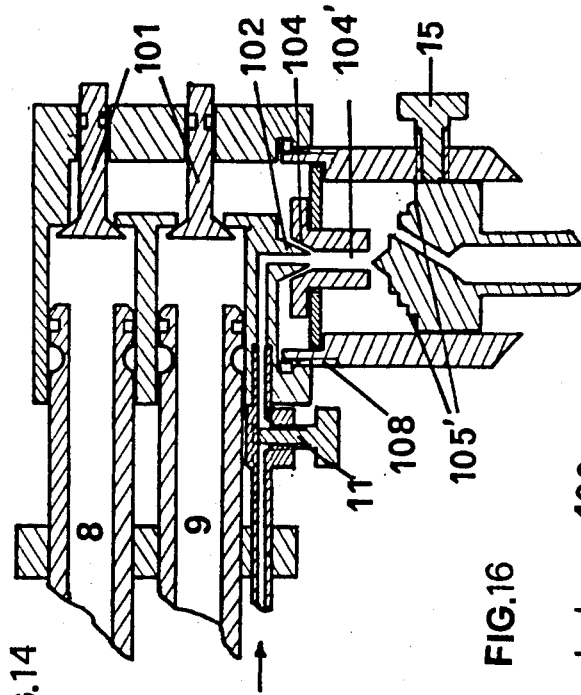

FIG. 14 shows a vertical section of a variant of a nozzle with convex pyramidal counterboring shapes with cylindrical steps.

Figure 15:
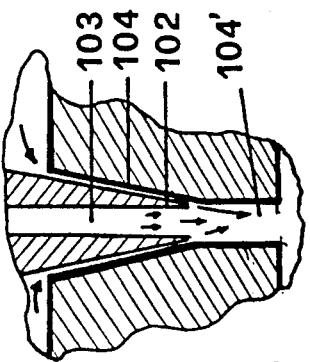

FIG. 15 shows in particular an enlargement of the conical nozzle.

Figure 16:
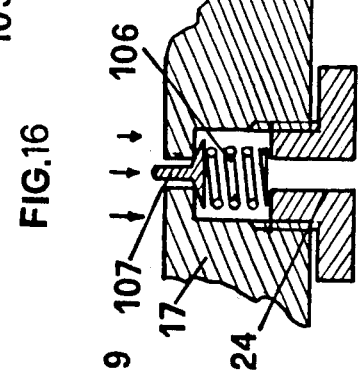

FIGS. 16 an 17 show the vertical section of two variants of the discharge valve for the adjustment of the thermal dilatation of the milk in the coil.

Figure 18:
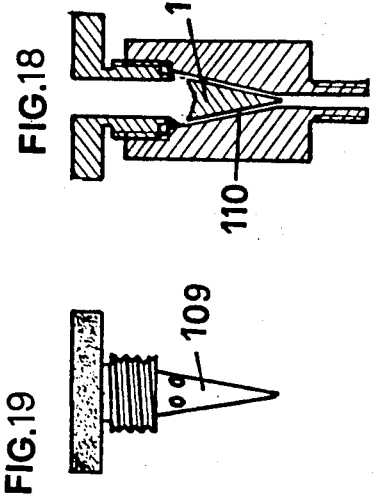
Figure 19:
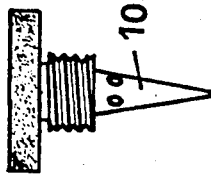

FIG. 18 shows the vertical section of a flow regulator, consisting in a perforated taper pin, shown in a lateral view in FIG. 19, for varying the passage of the pre-heated or atmospheric air following to the extraction thereof with respect to the conical housing shape.

The figures show a device for the preparation of foamy milk comprising a hollow structure 1 for containing oil or other heating liquid, with an upper opening 2 for the level control and for the filling up, and with an inner coil 3 for the leading of the milk, said coil being immersed in the liquid and suitable for the heat exchange.

Said container 1 is provided with wall couplers 4, with electric contacts 5 for the feeding of the inner heating resistance of the oil, adjusted by a thermostat 10, with tube 7 for the inlet in the coil of the milk under pressure coming from a pump 23, and with a tube 8 for the outlet of the heated milk.

The body of the nozzle for the production of the foamy milk is fed by said tube 8 leading the warm milk, by a tube 9 for the cold milk under pressure pushed by pump 23, and by an inlet regulator 11 for the atmospheric air, led through a small tube 6 and taken from opening 19 and heated by the passing thereof through structure 1.

A pin 12 allows the blocking of the coupling of tubes 8 and 9 for taking off the body of the nozzle for periodical washing.

Said nozzle externally shows levers 13 for the opening of the warm and cold milk outflow valves, and a structure 14 comprising the counterboring shapes for the milk spout with the adjusting screw 15 thereof.

Pump 23 with the operating motor 18 thereof takes the cold milk from container 21 by means of suction tube 22 and through unidirectional valve 17 provided with an overpressure discharge valve 24 for the milk in overpressure, leading said milk, through fork 20, to utilization.

Structure 1 may be provided with an electric slow revolution motor 16 for determining the rotation of a small inner fan for the continuous mixing of the oil so as to avoid the convective motions thereof.

In the scheme of FIG. 2, besides the already mentioned details, 25 shows the electric contact, operated by levers 13 or by pushbuttons 26, for sending current to operating motor 18 of pump 23.

In the variant of FIG. 3, container 21' is provided with a sealing tap, with tubing 27 for leading the compressed air from an external compressor and with a pressure switch 28 which, when the pressure diminishes due to the milk outflow, determines the inlet of further compressed air.

It is obvious that in above mentioned variant the device according to the present invention is simplified, due to the elimination of pump 23, of unidirectional non-return valve 17 with the recuperator 24 thereof and also of the electric contact 25, the whole being replaced by the action of the compressed air.

The scheme of the variant of FIG. 4 shows a further simplification for domestic use, in which also structure 1, i.e. the heat exchanger, is eliminated, as container 21 will be filled up with already warmed up, tepid or cold milk, according to the needs, and pump 23 provides for the mixing thereof with the air in structure 14 of the nozzle by operating electric contact 25.

The variant of FIG. 5 is similar to the precedent with the sole difference that pump 23 is replaced by pressure reservoir 21'.

In this case also electric contact 25 is eliminated by using levers 13.

In the variants of FIGS. 6 and 7 the heat exchanging structure 1, with coil 3, is replaced by cylinder 29 full of oil and heated by an inner resistance, directly immersed in external pressure container 21' for the heating of the milk.

To said containers 21 and 21' the cold milk container 30 is coupled, at atmospheric pressure or external high pressure, so that mixer 31 works in suction with the only pump 23, with electric switch nozzle 25, or the presence of external pressure on both containers 21 and 21' allows the elimination of pump 23 and requests the use of outlet levers 13 for the foamy mixed milk.

The mixing nozzle, in the variant according to FIGS. 8, 9, 10, 11, 12, 13, is provided with mushroom valves 101 the end thereof externally projecting so as to be directly operated by pressure, for determining the connection between tubings 8 and 9 of the warm and cold milk through channels 109 realized in the body of the nozzle, with chambers 110 surrounding conical nozzle 102 being centrally perforated with channel 103 for the airtaking from tubing 6, suitable for being micrometrically screw-distanced from the truncated-cone shaped hollow crown 104 so as to modify the milk quantity to be mixed with the air in the straight tube portion 104', where the depression phenomenon due to the Venturi tube takes place, with air suction from tube 103.

The mix of air and milk at the outlet of tube 104' arrives against the counterboring shape 105, in form of a concave cone, where following to the turbulences and the repeated impact of the milk molecules with each other and with the structure, a foamy milk spout is obtained which pours out of a hole 106 of a body 107.

The body 107 show screw threads 108 which make it possible to vary the distance and therefore the neck for the passage of the milk between conical nozzle 102 and hollow crown 104 for the variation of the milk quantity of the mix and therefore of the foam consistence.

The variant of the nozzle according to FIG. 14 shows inlets 8 and 9 for warm and cold milk being instead of placed one near the other, one above the other, as well as the counterboring shapes for the spout of the mix consisting in a convex pyramidal structure with cylindrical steps with a functionality appropriate for the the purpose.

In FIG. 15 the arrow shows the motion of the milk and of the air in conical nozzle 102 which is to be distanced with respect to the truncated-cone shaped hollow crown 104 so as to vary the outlet flow of the mix.

Figure 17:
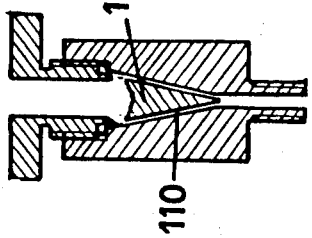

The two variants of overpressure discharging valves 24 according to FIGS. 16 and 17 may be placed in any point of the under pressure milk circuit, and in FIG. 16 the pressure increase compresses spring 106, removes mushroom valve 107 and allowing the outflow of a few drops, re-establishes the normal pressure value, while in the variant according to FIG. 17 the pressure increase determines the removing of small piston 108 for the same purpose.

The air flow regulator according to FIGS. 18 and 19 may be placed in any part of suction duct 6 and 103 for determining the adjusting of the passage of the air form the perforated taper pin 109 to the conical housing shape 110.

In a variant coil 3 may be replaced with hollow space placed around structure 1.

The relevant advantages of the present invention are the following:

the nebulization of the milk and contemporarily of the air obtaining a gradual and homogenuous mix.

The absence of any chemical physical transformation of the milk, due to the temperature increase above the water ebullition point (100° C.), as it happens in the treatment with overheated steam, due to the possibility of calibrating the thermostat around maximum 85° C.–90° C.

The complete atoxicity of the resulting drink, due to the separation of the milk from coil 3 and from the heating liquid.

The possibility of obtaining a "cappuccino" following to the previous mixing in container 21 of the milk with the coffee, or the like, by means of the previous filling up of container 21 with said components.

The possibility of obtaining also cold foamy milk, avoiding the warming up of the milk, but just mixing said milk up with air in nozzle 102–104.

A complete hygiene deriving from the possibility of periodically washing the hydraulic circuit with warm water mixed with suitable degreasers.

The realization of thick and consistent milk foam due to the pre-heating of the atmospheric air in channel 6, to the heat exchange with the air of structure 1 so as to avoid the following dilatation of the volume of each bubble, first cause of any possible breaking.

The possibility of including the device according to the present invention in all actually known coffee machines with a consequent considerable use practicity.

We claim:

1. A device for preparing foamy milk, comprising: a cold milk container, means for pumping milk from said container through unidirectional valve means to a heat exchanger adapted to raise the temperature of the milk, means to conduct heated milk from the heat exchanger to adjustable-gap venturi means adapted to mix air with the heated milk, turbulence producing means located downstream of said venturi means to further mix the milk and air, and operator controlled discharge means for controlling discharge of the aerated milk.

2. A device according to claim 1 wherein the turbulence producing means includes an impact surface providing a sudden obstacle to air mixed with heated milk flowing from the venturi means.

3. A device according to claim 2 wherein the impact surface is a concave cone.

4. A device according to claim 2 wherein the impact surface is a convex surface which has steps formed therein.

5. A device according to claim 1 having an air tube which extends through the heat exchanger and is connected to the venturi means.

6. A device according to claim 1 wherein the adjustable-gap venturi means includes two members which are connected together by screw threads.

7. A device according to claim 1 wherein the means for pumping milk includes means for supplying compressed air to said container, and a pressure switch for controlling said compressed air.

8. A device according to claim 1 wherein the heat exchanger includes a resistance heater and a body of oil which is heated by said resistance heater.

9. A device according to claim 1 having an overpressure discharge valve for discharging milk in response to a milk overpressure condition.

10. A device according to claim 1 having an air flow regulator for controlling the flow of air to the venturi means, said air flow regulator including a conical recess and a perforated taper pin which projects into said recess.

* * * * *